United States Patent [19]

Loczenski

[11] Patent Number: 5,692,368
[45] Date of Patent: Dec. 2, 1997

[54] APPARATUS AND METHOD FOR STRANDING ELONGATED STRANDING ELEMENTS

[75] Inventor: Martin Loczenski, Neustadt, Germany

[73] Assignee: Siemens Aktiengesellschaft, Munich, Germany

[21] Appl. No.: 779,937

[22] Filed: Jan. 7, 1997

Related U.S. Application Data

[62] Division of Ser. No. 416,680, Mar. 31, 1995, Pat. No. 5,626,010.

[30] Foreign Application Priority Data

Aug. 2, 1993 [DE] Germany .................. 43 25 931.6

[51] Int. Cl.⁶ .................. D01H 13/26; D01H 13/30
[52] U.S. Cl. .................. 57/294; 57/293; 57/314; 57/352
[58] Field of Search .................. 57/293, 294, 304, 57/352, 314

[56] References Cited

U.S. PATENT DOCUMENTS

| 4,195,468 | 4/1980 | King et al. ............ 57/9 |
|---|---|---|
| 4,385,485 | 5/1983 | Yonechi ............ 57/13 |
| 4,426,838 | 1/1984 | Garner et al. ............ 57/293 |
| 4,426,839 | 1/1984 | Garner et al. ............ 57/293 |
| 4,528,810 | 7/1985 | Vogelsberg ............ 57/294 |
| 4,615,168 | 10/1986 | Oestreich ............ 57/7 |
| 4,663,926 | 5/1987 | Girardon et al. ............ 57/6 |
| 4,757,675 | 7/1988 | Oglesby et al. ............ 57/6 |
| 4,796,414 | 1/1989 | Bruggmann et al. ............ 57/6 |
| 4,813,223 | 3/1989 | Nipper et al. ............ 57/294 |
| 4,974,408 | 12/1990 | Karhu ............ 57/293 |
| 5,237,809 | 8/1993 | Oestreich et al. ............ 57/293 |
| 5,307,617 | 5/1994 | Karhu ............ 57/293 |
| 5,626,010 | 5/1997 | Loczenski ............ 57/294 |

FOREIGN PATENT DOCUMENTS

| 0 151 367 | 8/1985 | European Pat. Off. . |
|---|---|---|
| 0 529 610 | 3/1993 | European Pat. Off. . |
| 24 11 151 | 9/1975 | Germany . |
| 38 08 037 | 9/1989 | Germany . |

OTHER PUBLICATIONS

Japanese Abstract, vol. 10, No. 243, 61–73914, Apr. 16, 1986, "Manufacture of Optical Fiber Cable".

*Primary Examiner*—William Stryjewski
*Attorney, Agent, or Firm*—Hill, Steadman & Simpson

[57] ABSTRACT

An elongated rotating accumulator used for stranding together stranding elements, (KS1) has chambers (KA1–KA4) at least sections of which are inwardly open and in which stranding elements (VS1–VS4) can be fed to a stranding disk (VS) in each case separately from each other.

30 Claims, 8 Drawing Sheets

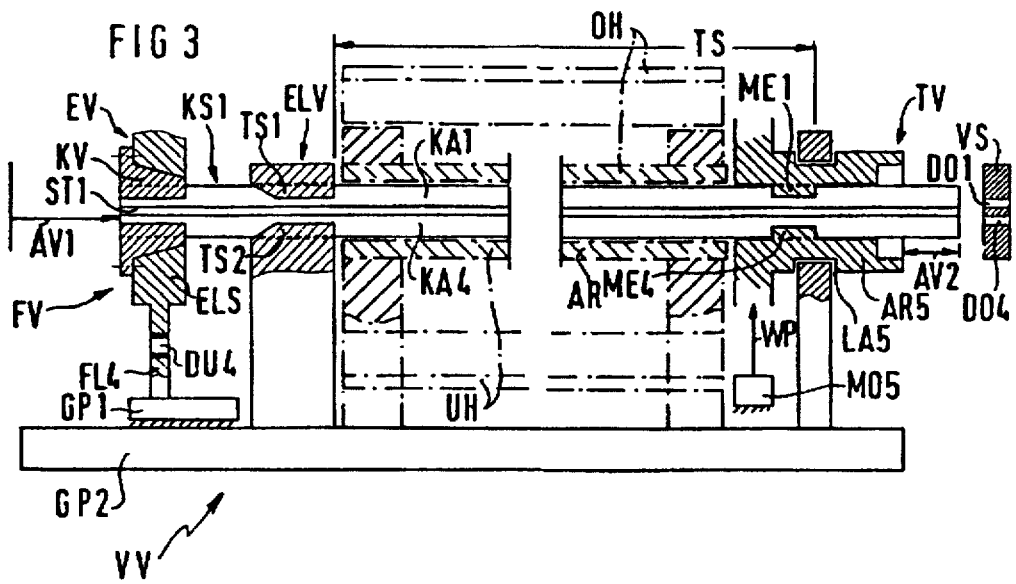
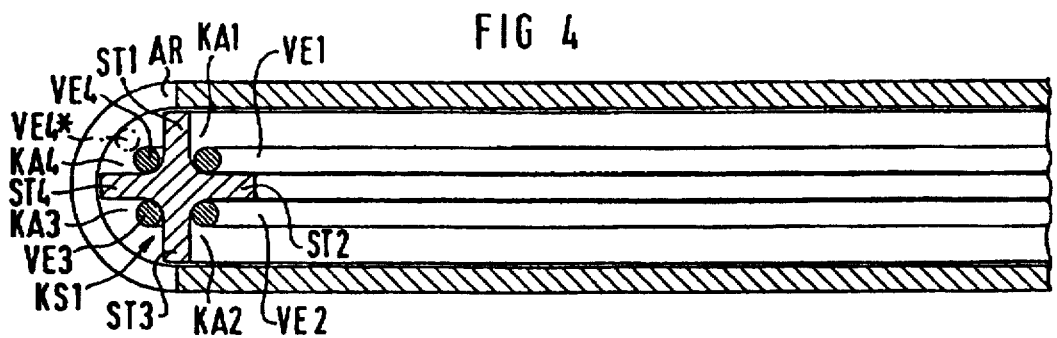
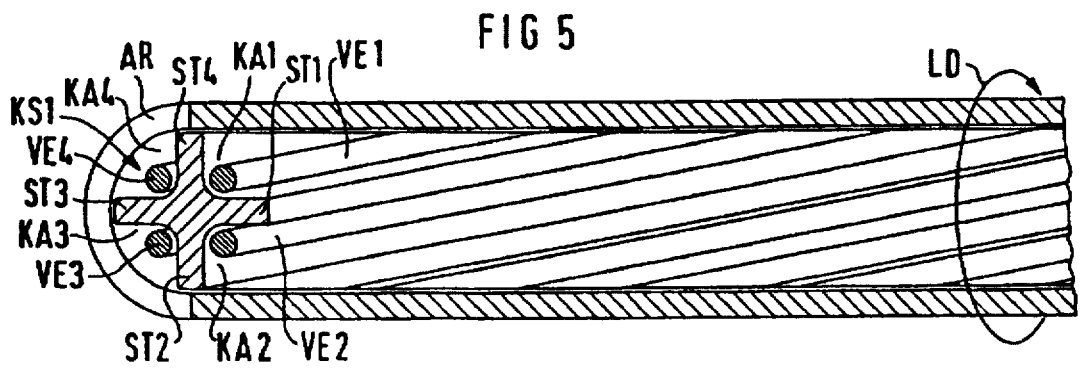

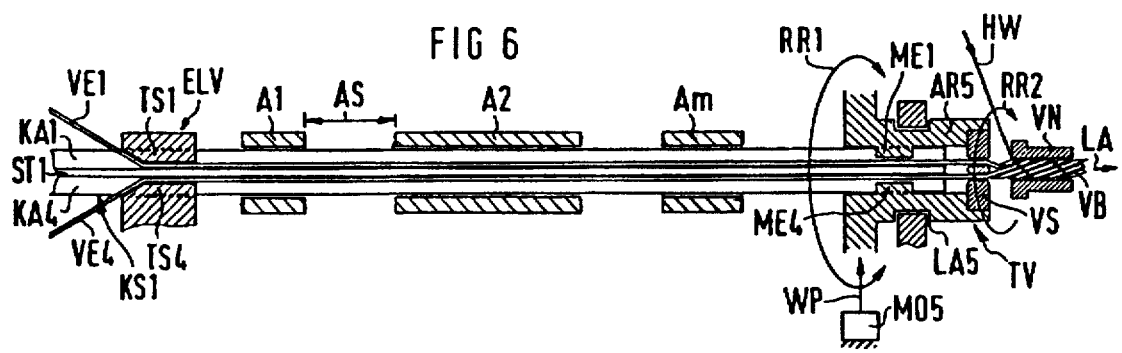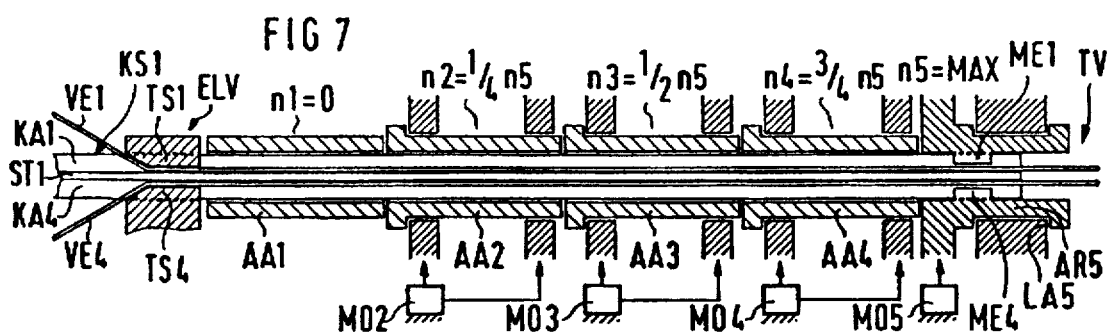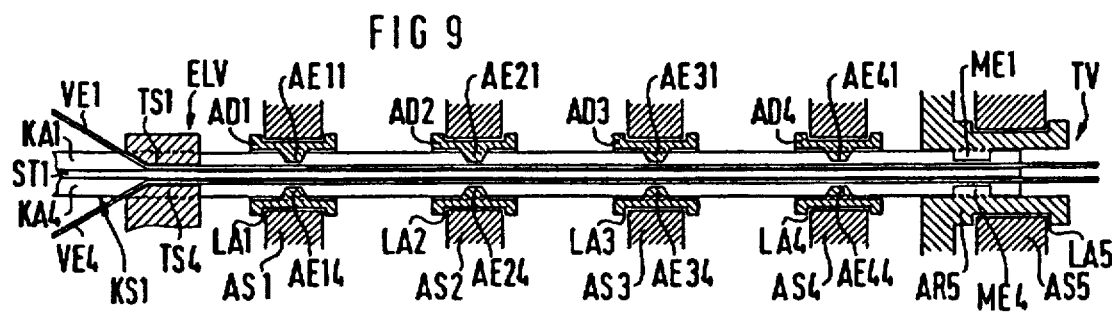

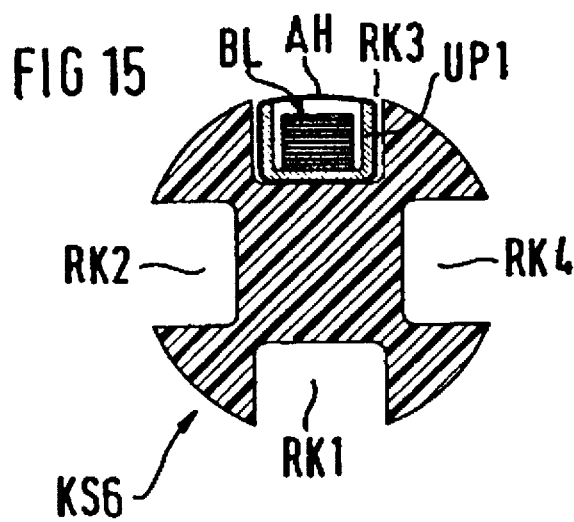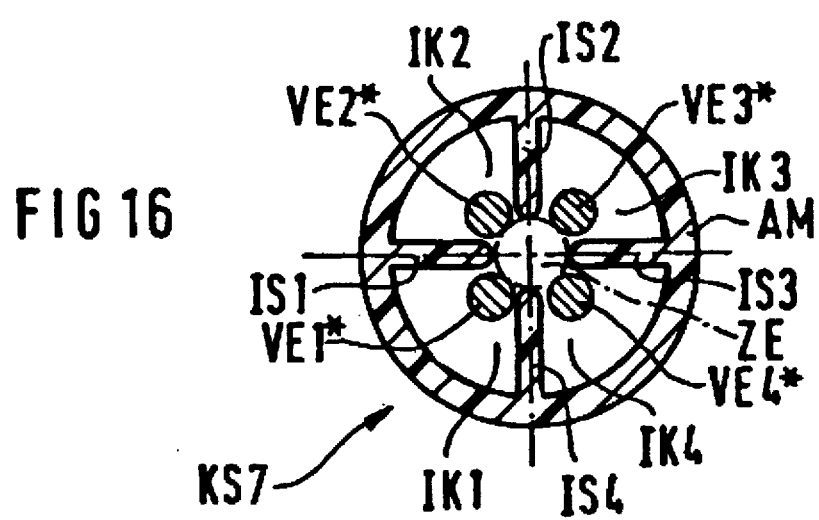

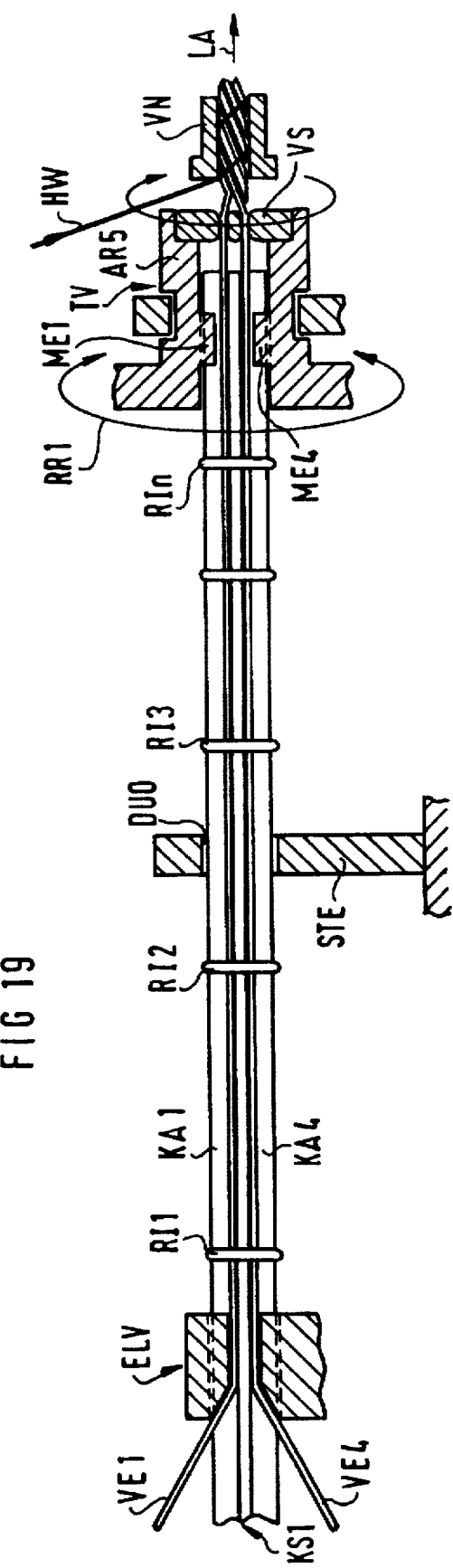

APPARATUS AND METHOD FOR STRANDING ELONGATED STRANDING ELEMENTS

CROSS REFERENCE TO RELATED APPLICATION

This is a divisional of application Ser. No. 08/416,680, filed Mar. 31, 1995, now U.S. Pat. No. 5,626,010.

The invention relates to a cable-twisting device or an apparatus for stranding elongated stranding elements, using a rotating accumulator extending in the longitudinal direction, via which the stranding elements are fed to a stranding disk.

An apparatus of this kind is known from EP 0 151 367 B1. There, provision is additionally made of freely rotatable perforated guiding disks on a tube accumulator, the said perforated guiding disks being driven independently with respect to the tube accumulator. The perforated guiding disk in this arrangement must be fitted as an additional element on the tube accumulator and must be supported. By means of the perforated guiding disk, the stranding elements are lifted off from the tube accumulator, since the guiding apertures of the perforated guiding disk lie on an increased part-circle diameter.

A tube, whose surface is intended to be designed to be extremely smooth is known from DE-A 24 11 151. For this purpose, the tube can be provided with longitudinally extending grooves, the stranding elements always running transversely over the grooves during stranding and bridging over the latter.

A stranding apparatus is known from EP A1 529 610, in which a tube, closed on all sides, is provided for each stranding element.

SUMMARY OF THE INVENTION

The invention is based on the object of configuring the construction of a stranding apparatus in a simpler fashion. According to the invention, this object is achieved in an apparatus of the type mentioned above, wherein the accumulator further has open chambers which extend in the longitudinal direction of the accumulator and serve for the accommodation of the stranding elements.

Hence, the accumulator itself effects the specific guidance of the stranding elements, as a result of which not only is an especially simple construction achievable but, in many cases, even a better mode of operation. By means of the use of open chambers, the accessibility and the insertion, respectively, of the stranding elements is especially simplified.

The invention relates also to a method for stranding elongated stranding elements, using a rotating accumulator, extending in the longitudinal direction, via which the stranding elements are fed to a stranding disk, which is characterized in that the stranding elements are guided in open chambers of the accumulator which extend in the longitudinal direction of the accumulator.

In an embodiment, an apparatus is provided for stranding elongated stranding elements. The apparatus includes a rotating stranding disk and a rotating accumulator extending in a longitudinal direction. The accumulator which feeds the stranding elements to the stranding disk. Open chambers are disposed in the accumulator. The chambers extend in the longitudinal direction and accommodate the stranding elements. In an embodiment wherein each chamber respectively extends in a normally straight longitudinal line.

In an embodiment, a fixing device is provided on which the accumulator is rotationally mounted.

In an embodiment, an inlet device is provided to guide the stranding elements from a source toward the accumulator.

In an embodiment, an insertion device is provided for inserting the stranding elements into the chambers.

In an embodiment, the cross-sectional shape of each chamber is larger than a cross section of one of the stranding elements.

In an embodiment, the accumulator has radially extending separating elements which define the chambers. Accordingly, the accumulator may have a star-shaped cross section.

In an embodiment, at least one covering means at least partially encloses the accumulator closely against the chambers. This covering means may include an outer tube which surrounds the accumulator concentrically. The outer tube may have a circular cylindrical shape. In an embodiment, the outer tube extends substantially over an entire portion of the accumulator on which the strands are accumulated. In another embodiment, a plurality of outer tubes are provided which are arranged in a spaced longitudinal relationship to cover the accumulator in sections with gaps in between. In a further embodiment, the covering means comprises a guide ring.

In an embodiment, the covering means is arranged in a stationary manner, but in another embodiment, the covering means is rotatable.

In an embodiment, each covering means is coupled to the rotating accumulator.

In an embodiment, a drive device is operable to rotatably drive the respective covering means.

In an embodiment, a twisting device is provided on the accumulator. In a related embodiment, the twisting device has driver elements which engage in a positive manner in the chambers and drive the accumulator in a selected direction of rotation.

In an embodiment, the accumulator has, in an untwisted condition, a total length between 5 m and 10 m, and preferably a length between 6 m and 8 m.

In an embodiment, each chamber has a radial depth between 2 to 8 times, and preferably between 2.5 to 4 times, larger than a maximum cross-sectional width or diameter of the stranding elements.

In an embodiment, each chamber has an outer peripheral width at least 2 times, and preferably 6 to 9 times, larger than the maximum cross-sectional width of the stranding elements.

In an embodiment, each stranding element is an electrical transmission element and/or an optical transmission elements.

In an embodiment, the chambers are open radially inward.

The present invention further provides a method of stranding elongated stranding elements including providing a rotating accumulator which extends in a longitudinal direction. Via the accumulator, stranding elements are fed through the accumulator to a stranding disk. The stranding elements are longitudinally guided through open longitudinal chambers in the accumulator.

In an embodiment, the rotation of the stranding disk is reversed. The reversal is accelerated by spring torsion through the accumulator rod.

In an embodiment, the guiding step includes maintaining space between the stranding elements and a covering means.

In an embodiment, the accumulator is rotated in alternating rotational directions.

Additional features and advantages of the present invention are described in, and will be apparent from, the detailed description of the presently preferred embodiments and from the drawings.

The invention and its refinements are hereinafter explained in more detail using drawings, in which:

FIG. 3 shows the apparatus according to FIG. 1 in an insertion position.

FIG. 4 shows schematically, in a partially perspective enlarged representation, the accumulator of the apparatus according to FIG. 1 in the untwisted condition.

FIG. 5 shows schematically the accumulator according to FIG. 4 in the twisted condition.

FIG. 6 shows, in a schematic representation, a first modification of the apparatus according to FIG. 1.

FIG. 7 shows a second modification of the apparatus according to FIG. 1.

FIG. 9 shows a further modification of the apparatus according to FIG. 1.

FIGS. 11–19 show further modifications of the accumulator according to FIG. 1 or FIG. 10.

DETAILED DESCRIPTION OF THE PREFERRED EMBODIMENTS

Figure 1:
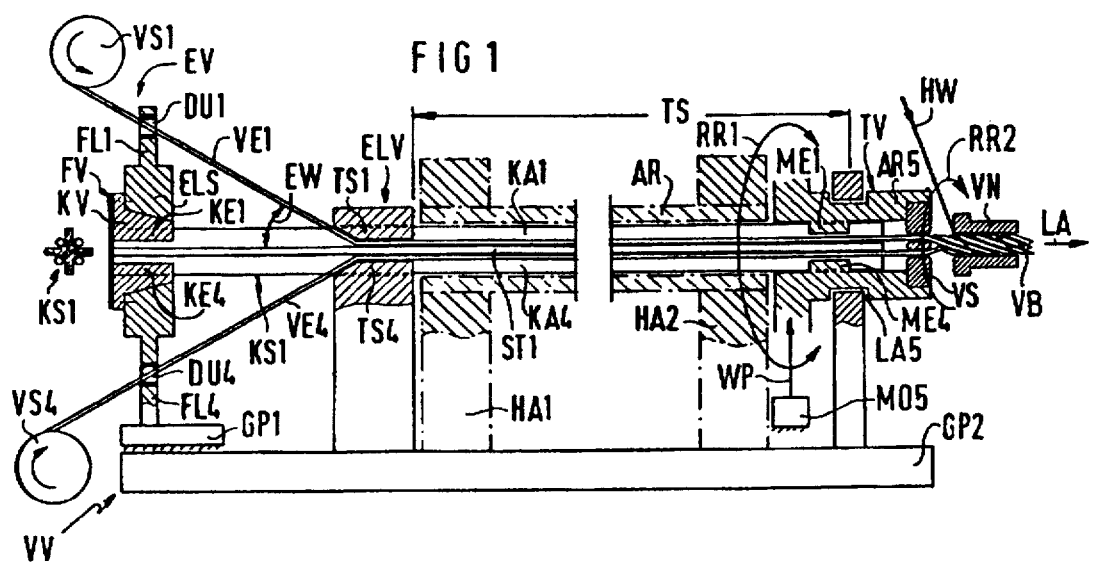
FIG. 1 shows, in a schematic cross section representation, an apparatus according to the invention.

In FIG. 1, by way of example, four fixed supply spools VS1 through VS4 of a stranding apparatus VV according to the invention are provided, from which supply spools elongated or strand-shaped stranding elements VE1 through VE4 are drawn off. In the cross section picture of FIG. 1, there are shown, for reasons of simplicity, only two of the total of four supply spools, namely the supply spool VS1 and the supply spool VS4, with their associated stranding elements VE1 and VE4. These supply spools contain, as elongated stranding elements, preferably electrical and/or optical transmission elements of different sizes, constructions, shapes, configurations, and so on. These could be, for example, electric lines (cores), optical lines such as, for example optical fibers, hollow cores, bundled cores etc., or the like. Preferably, stranding elements having round, in particular circular, cross sectional shapes are used. Apart from these, suitable stranding elements, as required, are also those with non-round cross sectional shapes such as, for example U-profile elements populated with fiber-optic ribbon stacks, rectangular fiber-optic ribbons, rectangular fiber-optic ribbon stacks, etc. Apart from the elements in the field of cable technology, other elongated products such as, for example, cords, strain elements, yarns, ribbons, strands or the like, can also be advantageously stranded using the apparatus according to the invention. The stranding elements are fed via corresponding draw-off devices, not shown in FIG. 1 for reasons of clarity, to a stationary inlet device EV. This inlet device EV is designed in FIG. 1, by way of example, as a stationary, rotationally-symmetrical guidance star, which has a preferably disk-shaped base holder ELS with adjoining webs or flanges FL1 through FL4, extending radially outward. The inlet device EV is connected securely to a stationary base plate GP1, for example via the web FL4. The flanges FL1 through FL4 of the guidance star have passage openings DU1 and DU4, preferably circular-cylindrical apertures, as selectively assigned guides for the stranding elements VE1 through VE4. In this way there results a kind of star-shaped ring of holes as inlet device EV, with the aid of which the elements VE1 through VE4 to be stranded are distributed uniformly over the periphery, that is to say are brought into a concentric and rotationally-symmetrical arrangement with respect to their common stranding axis (longitudinal direction) LA. In the exemplary embodiment of FIG. 1, reference is made to only four stranding elements, by way of example, for better illustration. The statements made to this effect hereinbelow are, however, also transferable without limitation to any number, that is to say n stranding elements with $n \geq 1$. Thus, in practice, a relatively large number, for example n=4 through n=20 or more of such stranding elements are provided.

The stranding of the strand-shaped elements VE1 through VE4 is carried out with the assistance of a rotatable accumulator KS1 for the stranding elements VE1 through VE4, the accumulator extending in the longitudinal direction LA, in particular extending in a straight line. The accumulator KS1 itself has four chambers or channels KA1 through KA4, open to the outside, for the accommodation and guidance of the stranding elements VE1 through VE4, which are respectively separated from each other by means of separating elements, in particular webs.

In this case, there are preferably provided as many chambers as there are stranding elements to be stranded with each other, each chamber respectively accepting exactly one stranding element, that is to say the four stranding elements VE1–VE4 are individually allocated to the four chambers KA1 through KA4. In the cross section picture of FIG. 1, in the untwisted condition of the accumulator KS1, only the two chambers KA1 and KA4 are visible. They extend in the axial direction parallel to the longitudinal axis LA of the accumulator KS1 over its complete length and are separated from each other by the web ST1. In particular, the channels KA1 through KA4 run in a straight line in the axial draw-off direction in the untwisted condition of the accumulator KS1. For the purpose of better illustration, the accumulator KS1, designed as a chamber strand, is drawn, to the left in FIG. 1, in the region of its inlet side end additionally with its cross section profile (together with inserted, for example round conductors, as stranding elements), that is to say shown in a drawing plane perpendicular to FIG. 1, folded out through 90°. The accumulator KS1 of FIG. 1 has a cross-shaped rotationally symmetrical cross sectional profile, in which the chambers KA1 through KA4 are respectively formed by the interspace between two neighboring webs at right angles to one another and are open, in particular radially, to the outside. The chambers KA1 through KA4 advantageously have a chamber cross section which expands outward. Their cross sectional form is expediently selected to be larger than the profile cross section of the stranding elements.

Figure 10:
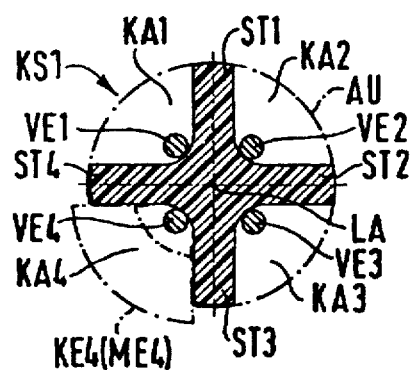
FIG. 10 shows, in enlarged cross section, the accumulator of the apparatus according to FIG. 1.

FIG. 10 shows this star-shaped, in particular cross-shaped profile cross section of the accumulator KS1 from FIG. 1 for the four elements VE1 through VE4 to be stranded, once more in an enlarged representation. The stranding elements here in FIG. 10 have preferably a circular cross section. The webs ST1 through ST4 extend An each case radially outward. They are arranged in such a manner that a continuous vertical and a horizontal bar is formed in each case by two opposite webs, such as, for example, ST1, ST3 and ST4, ST2. In each case two neighboring webs such as, for example, ST1, ST2 are thus at right angles to each other and enclose between themselves with their side walls in each case a sector-shaped chamber, for example KA2, which is open radially outward and essentially expands outward. The internal contour of each chamber corresponds approximately to the corner of an imaginary rectangle. For accommodating the stranding elements VE1 through VE4, the chambers KA1 through KA4 are in each case rounded off at the base of their chamber, in order there to be able to guide the stranding elements VE1 through VE4 in each case as far as possible without loading or indeed damage.

The relative size statements and ratio variables specified hereinafter in the description preferably refer in each case to the four-way stranding of communication cores of copper (Cu), in particular to so-called "ICCS" products (ICCS= "Integrated Communication Computer Systems"), but give also an orientation for numerous further embodiments of stranding elements. The absolute dimension statements are, by way of example, made in relation to one and the same stranding elements—round Cu cores—having a diameter between 1.6 and 2 mm.

The radial extent of the webs ST1 through ST4, which are of approximately equal length, and thus the external diameter of the accumulator (measured from the center of the accumulator radially outward) is expediently selected in each case to be between 2 to 12 times, in particular between 3 to 8 times, larger than the maximum cross-sectional width of the respective stranding element. In the case of "ICCS"-Cu cores with an approximately circular cross section, the web lengths are preferably selected in each case between 4 and 6 mm. The chamber depth is advantageously dimensioned to be 2 to 8 times, preferably 2.5 to 4 times larger than the maximum cross-sectional width of the respective stranding element, the chamber depth here being measured from the imaginary circular outer circumference AU, shown with a dash-dotted line, radially inward toward the chamber base. In the case of stranding round Cu-cores having a diameter between 1.6 and 2 mm, a chamber depth between 4 and 6 mm is advantageously provided.

It can be expedient to dimension the respective chamber as deep as possible, so that the stranding elements VE1 through VE4 are guided as close as possible to the longitudinal or stranding axis LA, extending in a straight line. Because of this position close to the center, that is to say close to the axis of rotation, of the stranding elements VE1 through VE4, centrifugal forces during the stranding can have a much smaller effect on the stranding elements VE1 through VE4 or can even be virtually completely ignored. The stranding elements VE1 through VE4 are thus guided in the chambers or openings KA1 through KA4 preferably with the smallest possible spacing from the common stranding axis (longitudinal axis) LA, that is to say they lie on an imaginary part-circle with the smallest possible radius. Advantageously, the stranding elements VE1 through VE4 lie in each case on the chamber base with a spacing with respect to the center point of the rotationally symmetrical accumulator between 1.5 to 2 times of their maximum cross-sectional width. In the case of stranding elements of circular cross section, the maximum cross-sectional width of the stranding elements thus corresponds to their circular diameter. In particular, their spacing (part-circle radius) with respect to the common stranding axis LA is selected to be smaller than 2.4 to 4.0 mm, in particular around 1.8 mm in the case of approximately circular stranding elements (Cu-cores). The chamber width is expediently dimensioned in each case at least 2 times, in particular by 6 to 9 times, larger than the maximum cross-sectional width of the respective stranding element, as viewed around the periphery. The chamber width is preferably set in each case between 3.2 and 18 mm, in particular between 10 and 14 mm, in the stranding of circular stranding elements (Cu-cores) having a diameter between 1.6 and 2.0 mm. At the same time, because of these openings reaching preferably as far as possible towards the stranding axis or axis of rotation LA, a favorable dynamic behavior of the accumulator KS1 during the stranding is also ensured: the said accumulator thus has advantageously, for example, only small moments of inertia (such as, for example, a low mass moment of inertia and torsional moment), small wall thicknesses of its webs, as a whole a small oscillating mass and a compact construction of small volume. Due to the position and guidance of the stranding elements as close as possible to the axis of rotation, the said stranding elements also essentially remain on the chamber base during the twisting of the accumulator, that is to say the stranding. A migration of the stranding elements out of the chambers or their lifting off because of centripetal forces is thus largely avoided, with the result that they can be guided isolated or separately from each other in the channels. Thus, in an advantageous way, an improved mode of operation of the stranding process is ensured.

In FIG. 1, a fixing device FV is provided preferably on the inlet side, left end of the accumulator KS1, by means of which fixing device the said accumulator is fixed there in a rotationally secured manner in the peripheral direction. In FIG. 1, this fixing device FV is formed by a cone-shaped clamping part or a clamping device KV, tapering in the passage direction, which is clamped centrally in the inlet device EV in a rotationally non-fixed manner. The rotational blocking or locking (=torsional blocking) of the accumulator KS1 in the peripheral direction is achieved by the rigid cone-shaped clamping part KV having web-like clamping elements KE1 through KE4, extending in the longitudinal direction, which project in each case at least partially or completely into the accommodation chambers KA1 through KA4 and are seated there in an essentially positively fixed manner, as seen around the periphery. For this purpose, the clamping elements KE1 through KE4 approximately have a profile cross-sectional shape the external contour of which essentially corresponds to the internal contour of the chambers KA1 through KA4 (see FIG. 10).

In FIG. 10, by way of illustration, a clamping element of this type, for example KE4, is additionally drawn in with a dash-dotted line. The clamping element KE4 expediently reaches approximately up to one third of the chamber depth into the chamber KA4. In particular, it has approximately the form of a section of a torus, or is designed in a sector shape or trapezoidal shape and at least partially fills the chamber opening KA4. It is seated between the two webs ST4 and ST3 with some lateral play in such a manner that a clamping effect is achieved in the peripheral direction, with the result that the accumulator is held fixed in a rotationally fixed manner. Expediently, in this arrangement, the accumulator KS1 is held by the fixing device FV in a rotationally fixed manner over an axial length between 0.5 and 0.75% of its total length, in particular between 50 and 75 mm. The chamber width is advantageously selected to be somewhat larger than the respective web width of the clamping elements, seen around the periphery, with the result that sufficient lateral play is present in order still to be able to draw out the accumulator KS1 in the axial direction as required, for example in the event of disassembly from the fixing device FV, or, respectively, to drive it in axially during assembly into the stranding apparatus.

The cone-shaped clamping part KV of FIG. 1 is seated in the axial direction during operation with a kind of press fit or fixed in a positive manner in the cone-shaped tapering passage opening of the stationary base holder ELS, with the result that a locationally fixed rigid bearing is formed for the accumulator KS1 at its inlet side end. For operation, the accumulator KS1 is additionally positionally secured at its inlet side end face, fixed to the clamping part KV. As an example, this can be achieved in a simple way by the accumulator KS1 having at its inlet side end a retaining flange, extending radially outward, which engages behind the clamping part KV. In this way, a blocking or locking against displacing in the axial passage direction (longitudinal direction) LA is additionally effected for the clamping part KV and hence the accumulator KS1. Its inlet side end thus represents a rigid fixed point in the longitudinal direction and in the peripheral direction for the remaining longitudinal part of the accumulator.

In contrast, its other opposite end can be rotated freely in the peripheral direction, and can be lengthened or shortened unhampered in the longitudinal direction. If appropriate, it can also be expedient to provide the rotational fixing not at the inlet side end, but at a point of the accumulator KS1 which still leaves a sufficiently twistable residual length for a desired accumulator path. Thus, the rotational fixing can be provided preferably in the left or right half part of the accumulator, in particular at one of its two ends.

In order to be able to insert the stranding elements VE1 through VE4 into the radially outwardly open chambers KA1 through KA4 of the accumulator for stranding, the fixing device FV is arranged downstream of an insertion device ELV. This insertion device ELV is firmly connected to a stationary base plate GP2. It surrounds the accumulator KS1 in a ring shape or in the form of a cylinder. It engages in each case partially in the chambers KA1 through KA4 by means of insertion elements, in particular webs TS1 through TS4, and thereby presses the stranding elements VE1 through VE4, running in under tension, into the associated chambers KA1 through KA4. The stranding elements preferably come to bear under tension on the respective chamber base and are held in its vicinity even during operation. The webs TS1 through TS4 are designed essentially corresponding to the clamping elements KE1 through KE4. They are seated in the chambers KA1 through KA4, essentially positively, and thus secured against rotation in the peripheral direction (cf. KE4 in FIG. 10), with the result that a torsional block for the accumulator KS1 is formed by the insertion device ELV. For this purpose, the insertion elements have a web width in the peripheral direction which approximately corresponds to the chamber width viewed in the peripheral direction. In order to transfer the incoming stranding elements VE1 through VE4, running in at an inlet angle EW (measured in each case between their inlet side draw-off direction in front of the insertion device ELV and their stranding axis LA), as carefully as possible out of their concentric spool arrangement, remote from the axis of rotation, into the longitudinal course, close to the axis of rotation, of the chambers KA1 through KA4, the webs TS1 through TS4 are in each case beveled in the passage direction in their inlet region. In this way, there is formed in each case a kind of ramp, that is to say a beveled insertion opening for the incoming stranding elements VE1 through VE4. The webs TS1 through TS4 expediently extend into the respective chamber KA1 through KA4 to such an extent that the respective stranding element VE1 through VE4 comes to bear on the chamber base. The inlet bevel of the webs TS1 through TS4 is expediently selected in such a way that the inlet angle EW for the stranding elements lies between 5° and 30°. The webs TS1 through TS4 expediently project into the chamber over a length between 20 and 30% of the complete chamber depth. In particular, their web height is selected to be between 2 and 25 mm. If required, the insertion device ELV can also be rotatably supported, with the result that it can be carried along by the accumulator KS1 in the respective direction of rotation. In so doing, the fixing device FV at the inlet side end of the accumulator KS1 represents the rotational block so that, advantageously, virtually the whole or the complete length of the accumulator can be utilized for the stranding.

In the untwisted condition of the accumulator KS1, the chambers KA1 through KA4 extend in a straight line, approximately parallel to the longitudinal axis LA of the accumulator KS1, being let in concentrically in the profile or strand of the accumulator, but as close as possible to the axis of rotation of the stranding axis LA. In the untwisted condition, the accumulator KS1 expediently has a length between 5 and 10 m, in particular between 6 and 8 m.

The stranding is carried out by means of the accumulator KS1, in that the latter is twisted with an alternating direction of rotation (SZ stranding). The alternating rotational movement of the accumulator KS1 is illustrated in FIG. 1 by means of a double arrow RR1. In order to be able to operate the accumulator KS1 as a torsion rod, a twisting device TV is provided on its output side (right) end. The twisting device TV has a carrier tube AR5 arranged concentrically with the accumulator KS1, the carrier tube being supported freely rotatably in a bearing LA5 such as, for example,an air bearing, sliding bearing or ball bearing. The said carrier tube AR5 engages by means of driver elements ME1 through ME4, pointing radially inward, in the openings of the chambers KA1 through KA4 in an essentially positive manner (viewed in the peripheral direction), in order directly to drive the output side end of the accumulator KS1 in the respectively desired direction of rotation and thereby to be able to twist the accumulator KS1. The driver elements ME1 through ME4 have, in the cross-sectional picture of FIG. 1, an approximately rectangular shape. They are preferably seated in a fixed manner over an axial length between 0.1 and 0.65% of the total length of the untwisted accumulator KS1. Preferably, they have an axial length between 50 and 55 mm.

In FIG. 10, to illustrate the cross-sectional profile of the driver elements ME1 through ME4, the driver element ME4 is shown in the chamber KA4 with a dash-dotted line by way of example, in a drawing plane at right angles to FIG. 1, folded out through 90°. The driver element is essentially designed corresponding to the clamping element KE4 and has an approximately trapezoidal configuration. In this arrangement, it projects into the chamber KA4 to such an extent that the stranding element VE4 can still be drawn through with sufficient play at the chamber base. The external contour of the driver element ME4 is expediently matched to the internal contour of the chamber KA4, with the result that it engages in the chamber KA4 between the two webs ST3 and ST4 approximately in the manner of a good fit or a molded fit.

In this way, a fixed coupling or rotational fixing of the chamber body KS1 to the carrier tube AR5, driven in rotation, is formed in FIG. 1. In this arrangement, the driver element ME4 projects with some lateral play with respect to the side walls or webs ST3 and ST4 into the chamber KA4, with the result that the accumulator KS1, during its twisting or turning over during the stranding process, can be shortened in the axial direction in an unimpeded manner and, during its untwisting or reverse twisting, can be lengthened again. Advantageously, replacing the accumulator is thereby also significantly simplified, since it is axially displaceable and can be drawn out of the stranding apparatus VV in the axial direction in a simple way. The output side end of the accumulator in operation can thus be freely rotated in the peripheral direction and can be shortened or lengthened in the axial direction in an unimpeded manner. If necessary, it can also be expedient to provide the twisting device TV of FIG. 1 at the inlet side end and the torsion black at the outlet side end of the accumulator KS1, the accumulator KS1 then being supported rotatably on the inlet side.

In FIG. 1, a motor MO5 is provided as drive apparatus for the twisting device TV, the said motor engaging on the carrier tube AR5 on the input side, which is illustrated by means of an action arrow WP. The motor MO5 expediently drives a toothed wheel fitted on the twisting device TV, and thus the accumulator KS1, via a toothed belt not drawn in FIG. 1 for reasons of clarity.

A stranding disk VS, which rotates together with the carrier tube AR5 and thereby also together, that is to say synchronously, with the accumulator KS1, is seated in a fixed manner on the output side in the carrier tube AR5. The stranding disk VS in FIG. 1 has four passage apertures, of approximately circular cross section, in which the stranding elements VE1 through VE4 are guided, preferably with some play. These passage apertures are arranged on a part-circle around the stranding axis and preferably offset with respect to each other by the same peripheral angle. In each case they essentially have the same radial spacing from the outer surface of the accumulator. In this way, the stranding disk VS forms a kind of symmetrical circle of holes, which twists the stranding elements VE1 through VE4 with each other uniformly or equally without an elongated central element, in particular to form a symmetrical "star quad".

In contrast, if required, it can also be expedient to insert an elongated core or central element instead of one of the stranding elements into one of the guide channels KA1 through KA4. The core or central element is then preferably passed through an additional passage aperture (not drawn in FIGS. 1 through 3, for reasons of clarity) in the center of the stranding disk VS. This is made possible by the fact that, between the front side right end of the accumulator KS1 and the stranding disk VS, there remains a cavity or interspace, in which the core element can run from the outside toward the central passage aperture. The stranding elements are then advantageously stranded onto this centrally guided core element. A core element of this type can preferably be of the same type as the remaining stranding elements to be applied. In exactly the same way, it can be expedient under certain circumstances to use elongated products differing from the remaining stranding elements as the core element, such as for example a central element of high tensile strength. If appropriate, such stranding around of a core element with stranding elements can also be achieved by additionally providing a corresponding adapter or distributor disk downstream of, as viewed in the passage direction, the stranding disk VS of FIG. 1. A distributor disk of this type is constructed, corresponding to the stranding disk VS of FIG. 1, in the manner of a circle of holes, but has additionally in the center a passage aperture for the core element. An additional distributor disk of this type has been left out in FIG. 1 for reasons of clarity.

After leaving the stranding disk VS, the stranding elements VE1 through VE4 reach a stranding nipple VN, the stranded bundle VB thus produced being fixed with the aid of a holding winding HW. The holding winding HW As An this case wrapped around the bundle VB in a spiral shape, which is indicated with an arrow RR2. Subsequently, the bundle VB provided with the holding winding HW is fed to further processing apparatuses, not shown here, such as, for example, further stranding apparatuses or an extruder for applying an outer sheath.

The accumulator KS1 thus has in FIG. 1 on the output side a free end, which is driven in rotation, while it is held on the input side in a non-rotatable manner, that is to say clamped in a rotationally fixed manner. By this means, the accumulator KS1 can preferably be operated as a torsion rod, whose length can be set automatically or freely in the longitudinal direction: in this arrangement it is shortened in the event of increasing twisting and lengthened in the event of decreasing twisting. The accumulator KS1 thus acts along its twisting length TS as a so-called "breathing store".

Since, in the untwisted condition of the accumulator KS1 of FIG. 1, the chambers KA1 through KA4 extend as far as possible in the direct vicinity and parallel to the stranding axis LA, the centrifugal forces acting upon them are reduced or indeed minimized. In this way, it is largely ensured that the stranding elements VE1 through VE4 remain in the region of the chamber bases during the stranding, even under critical operating conditions. Therefore, the chambers KA1 through KA4 can remain uncovered at least partially or completely along the longitudinal extension of the accumulator KS1. The actual twisting length (accumulator path) TS of the accumulator KS1 extends in this arrangement from the insertion device ELV, acting as torsion block, approximately as far as the driving elements of the twisting device TV. In this arrangement, the accumulator KS1 is shown interrupted in the center of its twisting length, in order to illustrate that the actual accumulator KS1 is significantly longer than is shown in the schematic representation of FIG. 1. The stranding elements VE1 through VE4 are then guided separately from each other in the said outwardly open chambers KA1 through KA4 in the outer envelope of the accumulator during the stranding or twisting of the accumulator KS in a kind of channel, so that a specific path is allocated to the respective stranding element. By this means, it is also impossible for the stranding elements VE1 through VE4 to carry out undesirable movements such as, for example, to lift off from the chamber base, and get into undesirable positions. Rather, they always remain separated from each other in their respectively associated chamber. It is thus largely avoided, in an advantageous manner, that neighboring stranding elements, for example, contact, get mixed up with each other or indeed intertwine with each other during the twisting of the accumulator KS1. In a preferable way, by means of free guidance of the stranding elements VE1 through VE4 in the chambers KA1 through KA4, the said stranding elements are enabled to carry out, to a certain extent, also a reverse rotation. This is because they are guided in their chambers with play, so that they can thereby carry out balancing movements. In particular, they can at least partially roll on the respective chamber base or the chamber inner walls. The stranding elements VE1–VE4 thus run through the channels or chambers KA1–KA4 largely free of inherent torsion. Because of the chambers KA1 through KA4 of the accumulator KS1 of FIG. 1 being kept at least partially or totally free of covering means along the actual accumulator path TS, after the insertion of the stranding elements VE1 through VE4, a favorable dynamic behavior of the accumulator is largely ensured, in particular thanks to a low moment of torsional resistance and a low mass moment of inertia. In addition, a simple visual monitoring of the stranding process As thereby simultaneously made possible. At the same time, the respective accumulator KS1 prestressed by torsion acts as a spring store, which simultaneously supports the reversing of the accumulator KS1 or of the stranding disk VS coupled to it, respectively, and simultaneously introduces its spring energy back into the reversing process. The reversal of the direction of rotation of the stranding disk VS and of the accumulator KS1 connected to it in a fixed manner is thus accelerated by means of the elastic spring force built up because of the torsion. Thus, considered as a whole, there results an improved mode of operation of the stranding process.

For the accumulator KS1, an elastically twistable material is expediently selected, which acts like a torsion spring. Suitable materials are, in particular, spring steel (rods), refined spring steel, anodized Aldrey (an aluminum alloy), glass fiber-resin laminates, carbon fiber-resin laminates, extrudable plastics, preferably PE, PP, GI, possibly with fiber reinforcements in the longitudinal direction of the accumulator, or other plastics combinations. In this way, the accumulator can be produced in a simple manner and cost-effectively and is thus also replaceable in the case of wear without too great a cost. The dimensioning of the accumulator is preferably carried out in accordance with the torsional limitation of the material used and the resulting wrap-around angle in the case of complete filling of the accumulator. The total stress acting on the accumulator through the torsion and the tensile force of the stranding elements is expediently selected to be smaller than or equal to 40% of its permissible alternating torsional stress. The inherent stiffness of the accumulator KS1 is advantageously selected in such a manner that a uniform build-up of the spin lengths or the wrap-arounds of the stranding elements VE1 through VE4 inside the accumulator length TS between the insertion device ELV and the twisting device TV is ensured. The chambers KA1 through KA4 thus run uniformly around the stranding axis LA in a spiral shape, that is to say their pitch is approximately constant along the torsion length TS during the torsion.

As a result of the star-shaped, in particular cross-shaped cross-sectional profile with the small-volume chambers KA1 through KA4, the accumulator KS1 advantageously has a favorable dynamic behavior such as, for example, a low mass moment of inertia and low torsion moment, so that it can be rotated easily. In the case of very low spacings of the stranding elements guided in the channels with respect to the axis of rotation LA, in particular in the case of spacings between 1.5 and 6 mm, preferably between 3.5 and 5 mm, there advantageously result for the wrap-arounds of the stranding elements VE1 through VE4, very large radii of curvature, as a result of which there is low friction of the stranding elements VE1 through VE4 in the chambers KA1 through KA4 which in turn favors a uniform distribution of the wrap-arounds.

Figure 2:
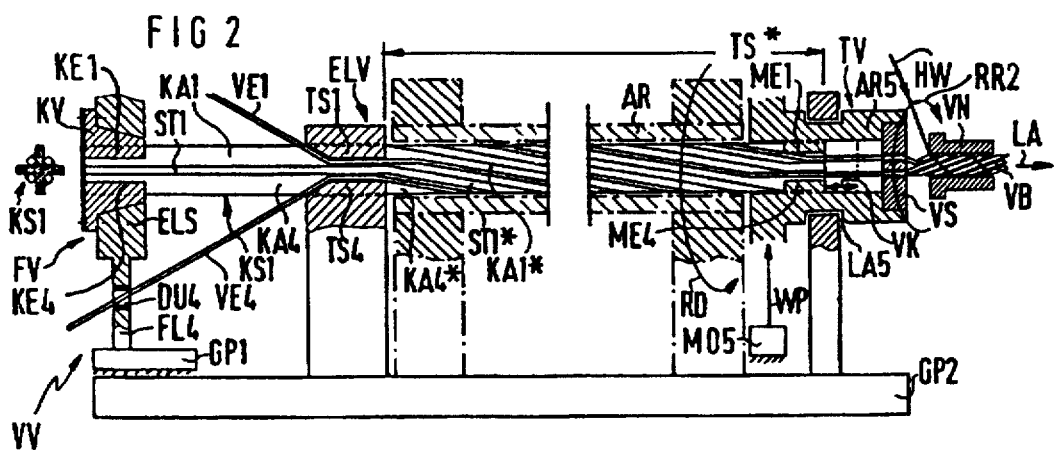
FIG. 2 shows the apparatus according to FIG. 1 in a twisted condition.

While FIG. 1 shows the accumulator KS1 in the untwisted condition, that is to say at the instant between a left-hand twisting and a right-hand twisting, the condition of the accumulator KS1 of FIG. 1 is shown in FIG. 2 in the case of a twisting in the clockwise direction (=right-hand rotation as viewed in the passage direction). The right-hand rotation is illustrated by means of an arrow RD. Unchanged elements carried over from FIG. 1 are provided with the same reference symbols. The twisting or accumulator path TS is formed, it not being connected in a fixed manner to the accumulator KS1, between the insertion device ELV and the twisting device TV, along which path the chambers KA1 through KA4, with the inserted stranding elements VE1 through VE4, run around the stranding axis LA, preferably uniformly in the longitudinal direction in the shape of a screw line or spiral. For reasons of simplicity, only the spiral-shaped course of the two channels KA1 and KA4 are identified in FIG. 2 with the reference symbols KA1* and KA4* as the web separating them is referenced ST1*. In this arrangement, the webs TS1 through TS4 of the insertion device ELV, engaging in the chambers KA1 through KA4, represent a left-hand side torsion block or stationary (rigid) rotational block, and the driver elements ME1 through ME4 of the twisting device TV represent a right-hand side rotational drive for the accumulator KS1. By means of the right-hand twisting, the accumulator KS1 is shortened in comparison with FIG. 1 by a path TS–TS*. The accumulator KS1 is preferably shortened by a maximum of 5%, in particular by a maximum of 1% and preferably by 0.2 to 0.5% of its total length in the untwisted condition. The length of the accumulator KS1 is preferably reduced by the path VK between 12 and 50 mm, in particular between 12 and 50 mm.

In order to be able to avoid any deviating or kinking out of the torsionally elastic accumulator KS1 during its twisting as reliably as possible, additional provision can advantageously be made, at least in part, of at least one covering or supporting means. In FIGS. 1 and 2, by way of example, an outer tube AR surrounds the accumulator KS1 along virtually its whole accumulator or twisting path in a concentric fashion, not being connected to the accumulator KS1 in a fixed manner. This outer tube AR is shown with a dash-dotted line in each case FIGS. 1 and 2. It is fastened with the aid of a holder HA1 at the beginning of the accumulator path TS and with a holder HA2 a the end of the accumulator path TS, stationary on the base plate GP2. By means of the stationary, preferably circular cylindrical outer tube AR, the accumulator KS1 is supported toward the outside and can therefore not deviate outward "like a corkscrew" during the twisting nor sag, that is to say the accumulator KS1 maintains, even in the twisted condition (cf. FIG. 2), approximately the same constant diameter along its axial extension as in the untwisted condition (cf. FIG. 1). In particular, the outer tube AR has for this purpose an internal diameter which approximately corresponds to the outer diameter of the accumulator KS1. The outer tube AR preferably surrounds the accumulator KS1 with play, in order to be able to substantially to ensure a friction-free twisting of the accumulator KS. At the same time, the outer tube AR additionally ensures that the apertures of the chambers KA1 and KA4 are covered to the outside and their stranding elements VE1–VE4 cannot leave their places in the chambers KA1–KA4, with the result that particularly reliable stranding is ensured. In particular, it is ensured in the untwisted condition of the accumulator, preferably for example in the case of a standstill of the stranding device, that the stranding elements inserted into the open chambers cannot/hang out of the chambers or even fall out of them. It is thus largely avoided that, in the event of any lifting off of the stranding elements VE1–VE4 from the chamber base, these respectively assume an impermissible position outside their respectively allocated chamber KA1–KA4. If, under critical operating conditions, the situation should arise that the stranding elements VE1–VE4 wander outward, they can roll on the inner envelope of the concentrically arranged, stationary outer tube or cover tube, but cannot leave the selectively allocated chambers KA1–KA4 or jump out of the latter. The outer tube AR thus additionally serves as a covering means for the radially outwardly open chambers KA1–KA4. It reliably prevents the stranding elements VE1–VE4 from leaving their chambers KA1–KA4, possibly then becoming, for example even in the outer space, looped over (twisted), for example possibly getting mixed up there or even intertwining with each other. The outer tube AR is preferably designed to be able to be folded out or to be separated, so that for the assembly or the insertion of the stranding elements into the respectively associated chambers, the accumulator KS1 can be made freely accessible. If appropriate, it can be expedient to pull off the outer tube AR in the longitudinal direction over the accumulator KS1, so that the chambers KA1–KA4 are not covered.

FIG. 3 shows how the stranding apparatus VV in accordance with FIGS. 1 and/or 2 can be charged with the stranding elements VE1–VE4. In detail, the method is such that, after removing the outer tube AR, first the stranding disk VS is removed from the twisting device TV at the end. For the purposes of illustrating this, the stranding disk VS is drawn in FIG. 3 in the imaginary extension of the accumulator KS1. The accumulator KS1 is then displaced in the axial direction, that is to say in the passage direction LA, by a displacement distance AV1. For this purpose, the base plate GP1 with the fixing device FV is designed to be axially displaceable, so that the accumulator KS1 can be moved to the right by the displacement distance AV1 with respect to its operating position in FIGS. 1 and/or 2. In so doing, it projects with its output side end out of the twisting device TV by a length AV2, so that this end becomes freely accessible and thus the process of threading in the stranding elements in the region of the twisting device TV becomes more manageable. In an expedient manner, the displacement distance AV1 is selected to be between 250 and 300 mm. The distance AV2 is expediently between 220 and 270 mm for the free accessibility of the output side end of the accumulator KS1. Subsequently, the stranding elements VE1–VE4 coming from their supply spools (cf. FIG. 1) are inserted into the outwardly open and thus freely accessible chambers KA1–KA4 of the untwisted accumulator KS1. In so doing, because of the free accessibility of the chambers KA1–KA4, the manageability of the stranding elements VE1–VE4 is significantly facilitated during insertion over virtually the entire length of the accumulator KS1. A complicated threading of the stranding elements into the channels is advantageously dispensed with, since the latter are not closed around but are outwardly open. Only in the region of the insertion device ELV and in the region of the twisting device TV is it necessary to thread the stranding elements over a very short length through the "tunnels" formed there, while the remaining accumulator is freely accessible. It can also be advantageous to design the insertion device ELV and the twisting device TV to be divisible, so that the latter can be folded out for assembly and the accumulator KS1 be made freely accessible even there. The accumulator preferably remains open, that is to say freely accessible, over a length between 90 and 97% of its total length. The stranding elements VE1–VE4 are finally threaded through the passage apertures DO1–DO4 of the stranding disk VS, the stranding disk VS is once more inserted in a fixed manner into the twisting device TV and the accumulator moved back into its operating position by the distance AV1 (to the left). By means of pushing back the accumulator KS1, the operating position is once more attained.

Inasmuch as the accumulator KS1 of FIG. 3 is fixed in a rotationally secure manner only at its inlet side end and has an outlet side free end, it can additionally advantageously be exchanged simply and rapidly.

In the case of using an outer tube AR, this is expediently designed to be divisible at least in part into a first half shell OH and a second half shell UH. To insert the stranding elements VE1–VE4, the two half shells OH and UH can then be folded away outward, which is illustrated with a dashed line in FIG. 3, so that the accumulator KS1 in FIG. 3 is again freely accessible, for example along the whole accumulator path TS.

FIGS. 4 and 5 show the accumulator KS1, together with the outer tube AR according to FIGS. 1 and 2 in an enlarged, partially perspective representation, during operation. Unchanged elements carried over from FIGS. 1 through 3 and FIG. 10 are provided with the same reference symbols. By way of example, in FIG. 4 that instant in the operation is depicted in which the accumulator KS1 is untwisted, that is to say at the instant of maximum speed before the beginning of renewed twisting. As stranding elements VE1 through VE4, round conductors, in particular cores of circular cross section such as, for example Cu-conductors, rest under tension on the bottom of the chambers KA1 through KA4 and are also held there as far as possible.

Proceeding from this untwisted basic condition of the accumulator KS1 of FIG. 4, the latter now experiences a twisting in an a counterclockwise direction, which is illustrated by means of an arrow LD in FIG. 5. In FIG. 5, the accumulator KS1 is twisted in the draw-off direction LA (cf. FIG. 1), when viewed in that direction, that is to say with a left-hand twist, the chambers KA1 through KA4 running around the stranding axis approximately in a spiral shape. As a result, these strand lays accumulate along the accumulator path (TS of FIG. 1) and, at the same time, provide the stranding elements VE1 through VE4 with a specific inlet position for stranding.

In the chambers KA1 through KA4, the stranding elements VE1 through VE4 are preferably largely freely guided, because of the chambers having a profile cross section larger with respect to the latter, so that they are themselves largely fed without spin, that is to say without inherent torsion, to the stranding nipple VN. In this way, SZ-stranding is preferably made possible, with extensive reverse rotation of the stranding elements. In an advantageous way, with the aid of the accumulator KS1, there are accumulated between 10 and 30 approximately equally distributed wrap-arounds or lays for the respective direction of rotation in the case of a twisting path (TS of FIG. 1) between 4 and 10 m, in particular between 6 and 8 m. The accumulator expediently executes between 8 and 40 revolutions per direction of rotation, in particular between 10 and 30 revolutions per direction of rotation, preferably beginning at about 16 revolutions per direction of rotation. In the twisting of the accumulator KS1, the stranding elements VE1 through VE4 essentially maintain their position on the base of the chambers KA1 through KA4.

In critical operating situations, such as for example in the case of oscillations of the accumulator, it may occur that the stranding elements VE1 through VE4 try to lift off outward from the chamber base. However, a partial outward migration can expediently be neutralized, with respect to the desired separate guidance of each individual stranding element, already by selecting the chamber depth to be correspondingly large, so that the stranding elements VE1 through VE4 are even then still guided separately from each other by means of the webs ST1 through ST4, if the said elements migrate radially outward in the chambers to a certain degree and no longer rest on the chamber base. Contact or mixing up of neighboring stranding elements is thus already significantly avoided. The outer tube AR, provided additionally if necessary, for example as a covering means, ensures firstly that the accumulator is supported around its periphery, seen from outside, that is to say it is stiffened and can thus not burst out laterally during stranding. The accumulator KS1 is in this instance expediently guided with such a large play in the outer tube AR that the friction between the accumulator KS1 and the outer tube AR is kept as small as possible. However, on the other hand, the outer tube AR covers the open chambers KA1 through KAn to the outside at the same time in such a manner that the stranding elements VE1 through VE4 are prevented from completely jumping out from their chambers KA1 through KA4 or from being clamped between the outer tube AR and a web such as, for example, ST1 of the accumulator, that is to say they can move in each case only in the interspace between the inner surface of the outer tube AR and the chamber walls of the respective chamber. The probability of lifting off or drifting off of the stranding elements is, especially at the instant of the untwisted condition of the accumulator, greater than during the duration of its twisted condition, since at this instant of reversal the rotational angular speed and thus also the centripetal forces becoming effective are at a maximum. Nevertheless, if a stranding element is flung completely outward out of its chamber, it is held back in its chamber in a particularly reliable manner by the outer tube AR. In FIG. 4, by way of example, the stranding element VE4 is lifted off from the chamber base and rests on the inner surface of the outer tube AR. This position of the stranding element is illustrated with a dash-dot line in FIG. 4 and provided with the reference symbol VE4*. The outer tube AR then enables in an advantageous manner a rolling of the stranding element, until it rests once more on the chamber base.

In FIG. 6, in a modification of the continuous outer tube AR of FIGS. 1 through 5, the accumulator KS1 is supported or covered over in each case only in sections by a plurality of outer tubes or covering tubes, following one another in the longitudinal direction and preferably of circular cylindrical shape, the said accumulator remaining open in each case in the intermediate section (gap) between two neighboring outer tubes and thus freely accessible. Unchanged elements carried over from FIGS. 1 through 3 are in each case provided with the same reference symbols. In FIG. 6, from a total of m outer tubes which are used as partial covering or support means, only three are drawn along the accumulator path for reasons of simplicity, specifically the outer tubes A1, A2 and Am. The covering or outer tubes A1 through Am in this arrangement are expediently provided as independent stationary (fixed) components, which surround the accumulator KS1 concentrically with play or with a gap and are not connected in a fixed manner to the latter, that is to say the outer tubes A1 through Am are decoupled from the rotational movement of the accumulator KS1. Expediently, two neighboring outer tubes such as, for example A1, A2, have in each case a spacing AS in the longitudinal direction, that is to say a gap between 0.2 and 1.5 m, in particular between 0.4 and 1.0 m from each other. Their covering length is preferably selected between 10 and 100 mm, that is to say they are preferably designed to be of ring or disk shape. In particular, the channels or chambers are covered by the supporting means in the axial direction over, in each case, a length between 3 and 10% of the total length of the accumulator, that is to say the chambers, considered as a whole, preferably remain open over a length between 90 and 97% of their total length. In particular, the channels remain open over a length between 5 and 9 m. The outer tubes A1 through Am, applied only in sections, in particular designed as guiding disks or guiding rings, if appropriate, largely ensure that the accumulator KS1 has a straight-line course even during its twisting, that is to say does not burst out sideways. At the same time the outer tubes A1 through Am also form sectional covering means or coverings for the chambers KA1 through KA4 and thus reliably secure the position of the stranding elements VE1 through VE4, that is to say the stranding elements VE1 through VE4 remain separated from each other in all operating situations and when at a standstill or in the case of assembly of the stranding device. They are thus always guided selectively along the accumulator path, that is to say they remain in their chambers KA1 through KA4 and can no longer fall out of the latter. In this arrangement, the sections of the accumulator between two neighboring outer tubes always remain freely accessible, which significantly simplifies the insertion or threading in of new stranding elements during assembly. Advantageously, removal of the outer tubes A1–Am is thus not specially necessary.

In FIG. 7, in a further modification of FIGS. 1 through 6, there is arranged a plurality of individual outer or carrier tubes AA1 through AA4 as supporting means, in particular virtually without gaps, after one another along the accumulator path TS, the said tubes respectively surrounding the accumulator KS1 and supporting it to the outside. They are preferably designed to be divisible, so that they can be folded away for inserting the stranding elements into the guiding channels. The carrier tubes AA1 through AA4 are preferably suspended or supported and driven in such a manner that they track the respective rotational movement of the accumulator section allocated to them as accurately as possible, in order to keep the relative movement (slip) between the respective accumulator section and the associated tube wall as small as possible. For this reason sections of the carrier tubes AA1 through AA4 are driven in rotation at different rotational speeds n1 through n4, respectively alternating their direction of rotation in synchronism with the twisting device TV.

Figure 8:
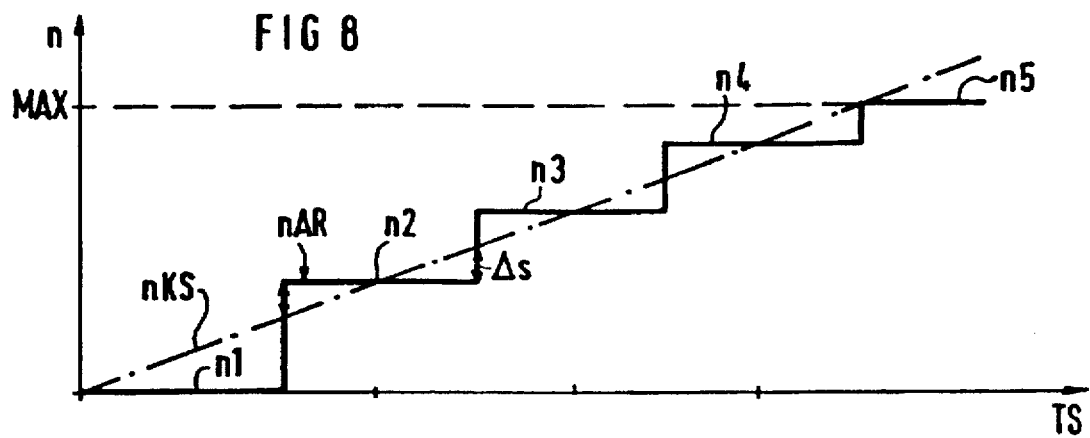
FIG. 8 shows a position-dependent rotational speed diagram for the apparatus according to FIG. 7.

FIG. 8 shows the rotational speed curve n of the accumulator KS1 along its twisting path TS, between the insertion device ELV, working as a torsional block, and the twisting device TV. The rotational speed curve for the accumulator KS1 is identified in FIG. 8 by means of the rising straight line nKS drawn with a dash-dotted line. Since the accumulator KS1 is fixed in a rotationally fixed manner at its inlet side end, it does not rotate at its inlet side, that is to say it remains untwisted there. In the passage direction, the rotational speeds nKS of the accumulator KS1 then rises linearly up to the maximum rotational speed nKS=MAX. The free, output side end of the accumulator KS1 rotates at this maximum rotational speed, since there it can be rotated deliberately with the aid of a twisting device TV in a largely free manner, without being secured in the peripheral direction and/or in the longitudinal direction. The free end of the accumulator KS1 thus rotates at the rotational speed n5=MAX of the carrier tube AR5, driven by the motor MO5. The rotational speeds n1 through n4 of the carrier tubes AA1 through AA4 of FIG. 7 are now set in such a way that the rotational speed nAR of the carrier tube respectively corresponds, approximately in the center of the respective carrier tube, to the rotational speed nKS of the accumulator, so that virtually no slip occurs there. The tubular guides AA1–AA4 of the twisting path TS, divided into four, of the accumulator KS1 of FIG. 7 then rotate, for example, at the following rotational speeds n1 through n4:

n1=0
n2=⅛n5
n3=½n5 n4=¾n5

The first carrier tube AA1 on the inlet side is thus driven at the rotational speed n1=0, that is to say it remains stationary, while the carrier tubes AA2 through AA4 are set into rotation by means of motors MO2 through MO4, corresponding to the rotational speeds n2 through n4. By means of the matching of the guiding tube rotational speeds n1 through n4 to the respective accumulator rotational speed nKS it is thus largely ensured that the wear of the accumulator KS1, in particular the wear and tear on its webs, the outer tubes or a loading or damaging of the stranding elements is largely reduced. At the same time, by means of this measure, an essentially uniform torsion of the accumulator KS1 is achieved, with the result that the wrap-arounds of the stranding elements are distributed uniformly along the accumulator path TS. Thus, in FIG. 8, there results a stepped course of the rotational speed n of the tubular guides or carrier tubes AA1 through AA4 and AR5 with the rectangular stages in each case of constant rotational speed n1 through n5. Nevertheless, because of the finite length of the tubular guides, there remains a residual slip at the beginning and at the end of the respective tubular guide. In FIG. 8, by way of example, a residual slip ■S=nKs−n2 occurs with respect to the accumulator KS1 in the case of outer tube AR2.

Differing from the outer tubes of FIGS. 1 through 7, not coupled (not connected) to the accumulator KS1, in FIG. 9 supporting elements or covering means AD1 through AD4 are seated in sections on the accumulator KS1 at a spacing from each other. These supporting elements or covering means are connected to the accumulator in a fixed manner and thus rotate synchronously with it. At least one supporting element such as, for example, AD1 through AD4, surrounds the respective accumulator section concentrically. It thus forms, in each case, a type of guide tube. In each case between two neighboring supporting elements such as, for example, AD1 and AD2, there preferably remains in each case a gap, that is to say the chambers KA1 through KA4 are not covered there, but are open radially outward and are thus largely freely accessible in operation and in the event of assembly. For positive driving (coupling) the supporting elements AD1 through AD4 in each case have four nose-like or web-like bulges AE11 through AE14, AE21 through AE24, AE31 through AE34 and AE41 through AE44. These bulges such as, for example AE11 through AE14, engage in each case essentially in the manner of a good fit or positively in the chamber apertures KA1 through KA4 corresponding to the driver elements ME1 through ME4 of the twisting device TV. They therefore bear on the chamber walls of their respective chamber (corresponding to the driver elements ME1 through ME4 of the twisting device TV) in an essentially positive manner and are thus driven synchronously in the respective direction of rotation during the twisting of the accumulator KS1. There therefore exists in each case a fixed coupling between the accumulator and the supporting elements or covering means. The driven supporting elements AD1 through AD4 are in each case held in bearings LA1 through LA4, preferably air bearings, in fixed supports AS1 through AS4, with the result that the accumulator KS1 is supported to the outside. The supporting elements AD1 through AD4 with the bearings LA1 through LA4 are advantageously fixed with a spacing from each other of between 1 and 2 m. The bearing LA5 for the twisting device TV itself is provided in a stationary support AS5. In this arrangement, a supporting element extends preferably between 30 and 50 mm in the longitudinal direction. In this way, the accumulator KS1 remains at least partially open, which significantly facilitates its handling thanks to the free accessibility. In particular, the supporting elements are designed in a ring shape, that is to say the largest part of the accumulator path remains open to the outside.

The supporting elements AD1 through AD4 additionally form sectional coverings for the open chambers KA1 through KA4. They therefore close the latter off only partially, as a result of which the stranding elements VE1 through VE4 are nevertheless always held and guided in the chambers. In this arrangement, the web-like bulges or driver elements of the supporting elements AD1 through AD4 fix the stranding elements VE1 through VE4 in a specific way, in each case on the chamber base, so that a specific guiding is provided to the stranding elements VE1 through VE4 over and over again, at intervals in each case, along the twisting path. Additionally or independently of this, for example sagging, impermissibly large oscillations or kinking out of the accumulator KS1 are largely avoided by means of the bearing of the supporting elements.

Figure 11:
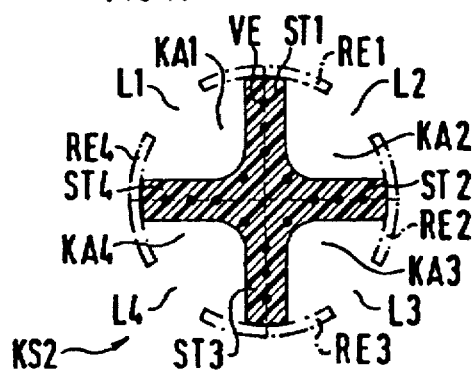

FIG. 11 shows an accumulator KS2 modified with respect to FIG. 10, in the profile of which reinforcing elements VE are additionally provided. Unchanged elements carried over from FIG. 10 are in each case provided in FIG. 11 with the same reference symbols. The said reinforcing elements impart an additional stiffness to the accumulator KS2, with the result that it can be twisted uniformly along its accumulator path, that is to say during the twisting the chambers run uniformly distributed about the longitudinal axis of the accumulator in the passage direction. Suitable materials for the reinforcing elements VE are preferably glass fiber-reinforced plastic (GRP) or aramide, which can expediently be laid in the longitudinal direction in the form of fibers, bands or in any other way, into the material of the accumulator KS2 during its production, especially extrusion.

If appropriate, it can also be expedient to fit retaining elements RE1 through RE4 in each case at the outer end of the radially outwardly extending webs ST1 through ST4. They are illustrated in FIG. 11 with a dash-dotted line. The retaining elements RE1 through RE4 are respectively designed as preferably curve-shaped webs, which in each case project on both sides into the respective chamber aperture and partially cover the latter. Preferably, the retaining elements extend in the shape of a section of a circular arc, that is to say they are located on an imaginary part-circle. By way of example, the chamber KA2 is partially covered in the region of its chamber walls (webs ST1, ST2) by the half of the retaining element RE1 respectively facing the chamber KA2, as well as of the retaining element RE2. A gap thus remains approximately in the center of the aperture of the chamber KA2, with the result that the chamber KA2 nevertheless remains freely accessible. With the aid of the retaining elements RE1 through RE4, it is largely ensured that the stranding elements do not leave their chambers in the event of any centrifugal forces becoming effective and cannot get into impermissible positions. Preferably, the retaining elements RE1 through RE4 hold back those stranding elements which respectively move outward in the region of the two chamber walls or webs, for example ST1, ST2, of a chamber, for example KA2. The retaining elements RE1 through RE4 thus do not form a completely closed outer surface in the form of a circular-cylindrical outer tube, but rather have gaps L1 through L4 seen around the periphery, in each case approximately centrally with respect to the respective chamber. Expediently, the retaining elements RE1 through RE4 extend, in the untwisted condition of the accumulator KS2, over the complete accumulator length in the longitudinal direction. However, it can also be expedient to provide retaining elements RE1 through RE4 in sections in the passage direction only at intervals, on the webs ST1 through ST4. The retaining elements RE1 through RE4 are preferably designed to be elastic. In particular, they have a reduced inherent stiffness in comparison with the accumulator KS1. Likewise it can also be expedient to extrude the retaining elements RE1 through RE4 together with the accumulator of FIG. 10.

Figure 12:
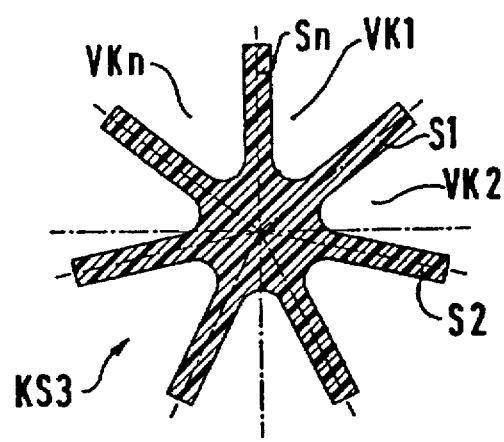

FIG. 12 with ran accumulator KS3, modified with respect to FIG. 10, divided into n parts, for n stranding elements to be stranded, having n chambers or channels VK1 through VKn, which are respectively separated from each other by means of webs S1 through Sn. The chambers VK1 through VKn preferably have in each case an approximately V-shaped or sector-shaped profile in cross section, the respective chamber base being provided with a rounded internal contour for the reliable and secure guiding of the stranding elements.

Figure 13:
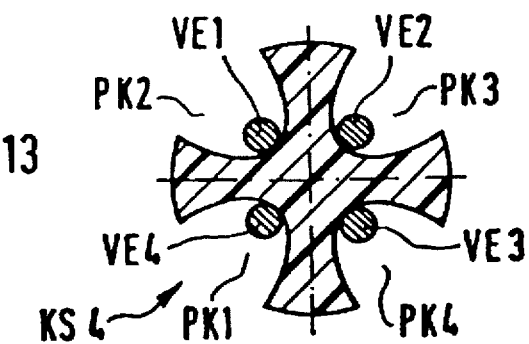

The rotationally-symmetrical accumulator KS4 of FIG. 13, modified with respect to FIG. 10, has chambers PK1 through PK4 having an approximately parabola-shaped cross-sectional shape, which are let into a circular-cylindrical starting body. As a result, the preferably round, preferably circular cylindrical stranding elements VE1 through VE4 can roll on the chamber walls with further reduced frictional force. In addition, an improved inherent stiffness results for the accumulator KS4 in comparison with the accumulator KS1 of FIG. 10, since the webs are broader on the outside (in the peripheral direction) than on the inside.

Figure 14:
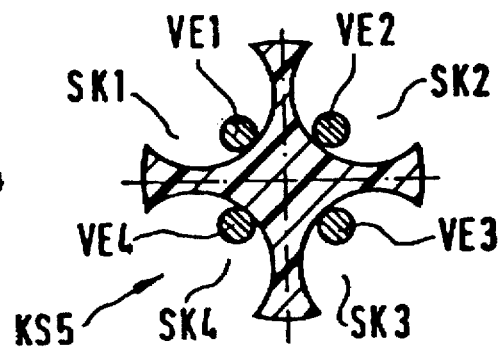

In FIG. 14, as a further alternative to the accumulator KS1 of FIG. 10, there is shown a rotationally-symmetrical accumulator KS5 having approximately shell-shaped chambers SK1 through SK4. The chambers SK1 through SK4 have, as inner edge or inner contour, approximately the form of a section of a circular arc, that is to say semicircular recesses are let into an originally circular cylindrical strand and are distributed uniformly around the periphery, as guide channels. This likewise improves the rolling behavior of the preferably round stranding elements VE1 through VE4, in comparison with FIG. 10.

FIG. 15 shows, as a further variant of the accumulator KS1 of FIG. 10, an accumulator KS6, into the originally circular cylindrical cross-sectional profile of which are let approximately rectangular or U-shaped chambers RK1 through RK4, open to the outside. These approximately rectangular chambers RK1 through RK4 are suitable preferably, for example, for stranding rectangular or U-shaped fiber-optic ribbons stacks or, for example, stacks of U-profile elements having ribbon stacks inserted. For reasons of clarity, only one U-profile element UP1, equipped with a fiber-optic ribbon stack BL, is drawn in the especially radially outwardly open chamber RK3. The U-profile element UP1 is in this case surrounded all around with an approximately rectangular sleeve AH. The U-profile element UP1 is advantageously accommodated at least completely by the chamber RK3, so that it does not project out of the chamber aperture. For this purpose, the chamber RK3 has a chamber cross-sectional shape which essentially corresponds to the cross-sectional shape of the stranding element, that is to say the respective chamber is matched with reference to its depth in the radial direction and its width in the peripheral direction to the dimensioning of the respectively assigned stranding element. The chamber RH3 can preferably be dimensioned in such a way that the U-profile element UP1 is sunk into the chamber RK3 with a free space (radial play) with respect to the external diameter of the accumulator. The radial play can expediently be selected to be about approximately 0.3 mm. With respect to the chamber walls, the U-profile element UP1 preferably has a lateral play (free space in the peripheral direction), in particular 0.25 mm per side. The chamber cross section is thus expediently selected to be somewhat larger than the profile cross section of the respective stranding element, in order to be able to carry out the drawing off of the stranding element through its allocated channel with as little friction as possible.

Viewed as a whole, it may be expedient as far as possible to match the chambers to the cross-sectional shape of the respective stranding element as far as possible. In particular in the case of stranding non-round elements such as, for example those having sector-shaped, trapezoidal, rectangular cross-sectional shape, the guide channels or chambers have chamber cross sections corresponding approximately to the latter. By this means, in particular, stranding without reverse rotation is made possible. Of course, it is likewise also possible, if appropriate, to dimension the chambers or channels to be so large that the non-round stranding elements themselves are in turn freely rotatable, as a result rotate back at least partially and can thus be stranded largely free of inherent torsion. For this purpose, the channels expediently have cross-sectional shapes like those of the channels in FIGS. 10 through 14, that is to say a round inner contour, in order to permit or to facilitate the inherent rotation of the stranding elements. Preferably, similar ratios of stranding element size to chamber size are true in this case as for the stranding elements in the chambers of the accumulators of FIGS. 1 through 14.

FIG. 16 shows a further rotationally-symmetrical accumulator KS7, modified with respect to FIG. 10, which has chambers IK1 through IK4 open radially inward. These chambers IK1–IK4 are wider on the outside than on the inside, as seen around the periphery. For the chambers IK1 through IK4, provision is made in particular of an approximately circular sector-shaped or trapezoidal cross section. They are separated from each other by means of webs IS1 through IS4, which extend radially inward from the circular cylindrical outer surface AM of the accumulator KS7. The webs IS1 through IS4 do not, however, end in the center point or center of the accumulator KS7 (in the cross-sectional picture of FIG. 16), but rather before this, so that the chambers IK1 through IK4 remain open to the inside. Additionally, in the center of the accumulator KS7, if required, provision can be made of a central element ZE extending in the passage direction, which covers the inwardly open chambers IK1 through IK4 on the inside. The central element ZE is illustrated with a dash-dotted line in FIG. 16. A stranding element drawn off in the passage direction such as, for example, an electrical and/or optical transmission element, can preferably be provided as central element ZE, in particular one with a circular cross section such as, for example, a round conductor. In normal operation, the stranding elements arranged around it concentrically can roll on the latter and can finally be stranded in the stranding nipple. In this way, the stranding elements designated by VE1* through VE4*, even in the case of a position or guidance close to the axis of rotation, can be held back from leaving their chamber and can be guided separately from each other. For inserting the stranding elements VE1* through VE4*, the accumulator KS7 can advantageously be taken apart or folded open in two half shells.

By means of the apparatus according to the invention and the associated method, numerous types of round or non-round stranding elements can be stranded with a correspondingly designed accumulator. As stranding elements, electrical and/or optical transmission elements of various sizes, shapes and constructions can be considered for stranding elements. These can be, for example, electrical conductors (cores), electrical ribbon conductors, optical conductors (such as, for example, optical fibers, hollow cores, bundled cores), fiber-optic ribbons, fiber-optic ribbon stacks, U-profile elements having optical fibers, etc. Because of the favorable dynamic properties, advantageously high rotational speeds, in particular between 1500 and 2000 l/min can be achieved using the accumulator according to the invention.

If appropriate, it can also be expedient to insert more than one stranding element respectively into one chamber. This is suitable in particular when very many stranding elements are to be pre-stranded and the accumulator cross section is no longer sufficient for a subdivision into n individual guiding channels for n stranding elements. At least two stranding elements are then expediently to be guided per chamber or channel, so that a multiple guide is formed by each channel. The plurality of stranding elements in each channel in this case can advantageously respectively be stranded individually loosely alongside each other or, for example, also preferably pre-stranded with each other, combined to form a bundle, connected together mechanically to form a ribbon conductor or guided in another way.

As an alternative to operating the accumulator as a torsion rod, an SZ stranding can also be achieved by supporting the accumulator with respect to its longitudinal extension in a freely rotatable manner and driving it in alternate directions of rotation. In FIG. 1, by way of example, the fixing device FV is then omitted and is preferably replaced by a bearing, so that the accumulator is also supported in a rotatable manner at its inlet side end. If necessary, an additional drive can also be provided there, which is expediently operated in synchronism with the motor MO5 of the device TV. If, in so doing, these two drives are operated at rotational speeds and/or directions of rotation differing from each other, the result is advantageously in turn a torsion of the accumulator, which enables faster reversal from one direction of rotation to the other. A uniform rotational movement with alternating direction of rotation of the accumulator can of course also be ensured by the accumulator having, in addition to or independent of its end side rotational bearing, further bearing points and/or associated drives between its inlet side end and its outlet side end. The insertion device ELV of FIG. 1 is expediently not designed to be stationary in the case of a free rotational bearing of the whole accumulator, but is supported so as to be rotatable, being connected to the rotating accumulator and driven along with it in each case in the respective direction of rotation. If necessary, it can also be expedient to let in the chambers or channels in a spiral shape about the longitudinal axis of the accumulator.

Furthermore, it is also possible to use the accumulator according to FIGS. 1 through 16 for stranding with the same lay or other types of stranding. Thus, for example, in the case of stranding with the same lay, the accumulator is no longer operated as a torsion rod or torsion spring but is, for example, rotatably supported in each case at both its ends and/or is driven in rotation there specially in each case. For this purpose the open chambers can expediently be let into the accumulator in such a way that they run in spiral fashion about the longitudinal axis of the accumulator in its quiescent condition. On the left-hand side of FIG. 1, the clamping device KV is expediently, for example, replaced by a rotating device, in particular a bearing with an associated motor, which drives by means of a toothed belt a toothed wheel fixed permanently on the accumulator. This input side rotating device is expediently driven, for stranding with the same lay, at the same rotational speed and always in the same direction of rotation as the output side device TV, that is to say in synchronism with the latter. An input-side rotatable bearing without its own drive is likewise possible instead of the fixing device FV. During operation, the stranding elements are then guided in the channels or chambers extending in a spiral shape. The insertion device ELV is in this case expediently not fixed but is preferably designed in such a way that it is seated in a fixed manner on the accumulator with its webs engaging in the chambers and is thus simultaneously driven in the direction of rotation.

By specifying the at least partially or sectionally or completely open channels (chambers) in the jacket of the accumulator to have other types of extensions such as, for example, of spiral shape, helix shape, screw-line shape, etc., rather than to extend in a straight line, it is in addition possible to use the method according to the invention for numerous applications such as, for example, stranding with the same lay/SZ-stranding.

Figure 17:
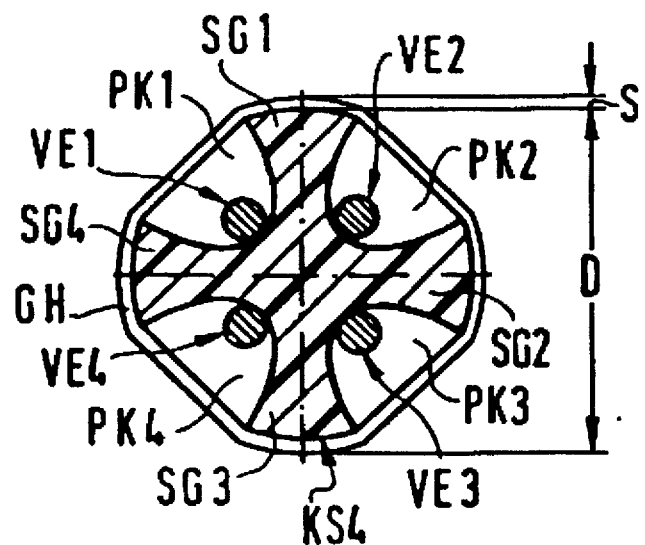

FIG. 17 shows, in an enlarged representation and schematically in cross section, the accumulator KS4 of FIG. 13 with an additional outer sleeve GH. This sleeve GH surrounds the accumulator KS4 all around and rests in a fixed manner on the end faces of the webs SG1 through SG4. The respective chamber PK1 through PK4 is bridged over or covered over by the latter, in each case largely in a straight line from one web end to the next, in order to counteract as far as possible an outward bulging during the rotational movement. In this way, the outer sleeve GH frames the accumulator KS4 approximately with the course of a "4-sided polygon", which is supported radially inward in each case at its imaginary corners by a web as a supporting column. For the outer sleeve GH, a material is advantageously selected, which is more elastic than the material of the accumulator KS4. An elastic material, in particular an elastomer such as, for example, polyurethane (PU) having a Shore number less than 60 (in accordance with DIN 53505), is advantageously used for the outer sleeve GH. The sleeve GH is preferably designed to be rubber-elastic. An elastic outer sleeve GH of this type advantageously ensures that the stranding elements VE1 through VE4 are always guided separately from each other in their associated channels PK1 through PK4. In this arrangement, the original structure, designed to be of low torsional resistance, of the accumulator KS4 is largely unimpaired by the additionally provided sleeve GH. The sleeve GH is preferably extruded onto the accumulator KS4 as a surface coating in the drawn-tube process. The sleeve GH is preferably connected in each case in a fixed manner to the ends of the webs SG1 through SG4, preferably by bonding or welding. It can also be expedient to expand the sleeve GH in comparison with its unexpanded initial condition, so that it embraces the accumulator as a loose surface coating and is seated in a fixed manner under tension on the webs of the accumulator KS4, under its elastic relaxation. The sleeve GH expediently has a wall thickness s which is between 1/25 and 1/40 of the diameter D of the accumulator KS4. In particular, the wall thickness S is selected to be between 0.3 and 0.5 mm.

A surface coating GH of this type can advantageously surround the respective accumulator such as, for example, corresponding to FIGS. 1 through 15, as far as possible along its whole accumulator path. In exactly the same way, it can, if appropriate, already be sufficient also to provide only individual non-metallic rings of a corresponding polygonal contour as covering means, spaced apart from each other along the longitudinal extension of the accumulator, so that the largest part of the accumulator remains uncovered. Plastic, in particular a rubber-elastic material such as, for example, PU or Teflon or other low-friction or wear-resistant materials are preferably used as non-metallic material.

FIG. 19 shows schematically, for example, the accumulator KS1 of FIG. 1 with such individual rings RI1 through RIn. In this arrangement, more rings are expediently arranged on the outlet side toward the twisting device TV as on the inlet side, since the rotational speed of the accumulator KS1 of FIG. 19 increases toward the outlet side, free end, that is to say viewed in the passage direction LA, the distance between two successive rings decreases in each case.

For the axial positional securing of the rings RI1 through RIn, an annular groove is expediently provided in each case on the outer periphery of the accumulator KS1, with the result that a kind of spring-ring securing is formed in the axial direction. By means of the rings RI1 through RIn, it is largely ensured that the stranding elements VE1 through VE4 always, that is to say in operation and in the case of assembly, remain in their guide channels KA1 through KA4, the free accessibility of the channels KA1 through KA4 being nonetheless largely maintained at the same time. In this manner, in particular new stranding elements can be inserted into the guide channels in a simple way.

If necessary, it can be expedient to support the elongated accumulator KS1 between its insertion device ELV and its twisting device at least one point in addition radially from the outside, in order to avoid any possible sagging of the accumulator as far as possible. In FIG. 19, by way of example, a support or bearing STE, in particular a bearing, is arranged for the accumulator KS1 in the middle of the accumulator path. The said support has a circular cylindrical passage aperture DUO for the accumulator, the internal diameter of the aperture DUO corresponding approximately to the external diameter of the accumulator KS1.

If appropriate it can also be expedient to provide a metallic material for the rings RI1 through RIn. In particular, these rings are coated on the inner side with a low-friction, wear-resistant coating such as, for example, Teflon. In this way, a possible rolling process of the stranding elements on the inner wall of the respective ring is favored.

Figure 18:
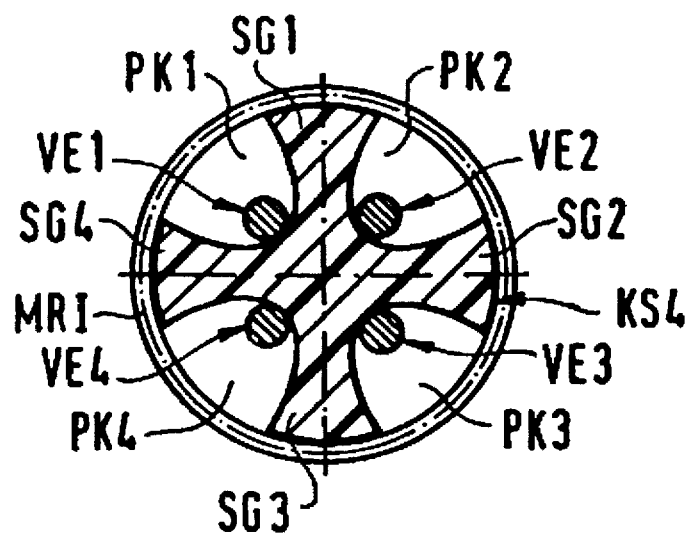

Finally, FIG. 18 shows a guide ring MRI, modified with respect to FIG. 17, having a circular contour which is seated, for example, on the webs SG1 through SG4 of the accumulator KS4 of FIG. 13. It is preferably fitted with some radial play on the accumulator KS4, so that it is rotatable in the peripheral direction. In the axial direction it is preferably positionally secured by means of a clip groove which is let in the peripheral direction, into the four webs SG1 through SG4 of the accumulator KS4 on the front end. A metallic, stiff material of sufficient dimensional stability is preferably selected for the guide ring MRI. In addition, if required a stiff plastic or the like can also be used for it. In addition, the same statements are incidentally true for the guide rings according to FIGS. 17 through 19 as those relevant for the covering means of FIGS. 1 and 6 through 9. In particular, corresponding to FIG. 9, for example, the guide rings RI1 through RIn of FIG. 19 can in each case be allocated a dedicated drive device, preferably a motor, the guide rings being positioned so as to be rotatable about the stranding axis. If necessary, the guide rings can also be coupled in a fixed manner to the accumulator.

It should be understood that various changes and modifications to the presently preferred embodiments will be apparent to those skilled in the art. Such changes and modifications can be made without departing from the spirit and scope of the present invention and without diminishing its attendant advantages. It is, therefore, intended that such changes and modifications be covered by the appended claims.

I claim:

1. An apparatus for stranding elongated stranding elements, the apparatus comprising:
   a stranding disk;
   a rotating accumulator extending along a stranding axis in a longitudinal direction for feeding the stranding elements to the stranding disk; and
   chambers disposed in the accumulator, the chambers extending in the longitudinal direction and being inwardly open radially with respect to said stranding axis to accommodate and guide of the stranding elements.

2. The apparatus as claimed in claim 1, wherein each chamber respectively extends in a straight line in the longitudinal direction.

3. The apparatus as claimed in claim 1, further comprising:
   a fixing device on which the accumulator is rotationally mounted.

4. The apparatus as claimed in claim 1, further comprising:
   an inlet device to guide the stranding elements from a source toward the accumulator.

5. The apparatus as claimed in claim 1, further comprising:
   an insertion device for inserting the stranding elements into the chambers.

6. The apparatus as claimed in claim 1, wherein the cross-sectional shape of each chamber is larger than a cross section of one of the stranding elements.

7. The apparatus as claimed in claim 1, wherein the accumulator has a star-shaped cross section.

8. The apparatus as claimed in claim 1, wherein the accumulator comprises:
   separating elements which extend radially toward said stranding axis to define the chambers.

9. The apparatus as claimed in claim 8, further comprising:
   at least one covering means at least partially enclosing the accumulator closely against the chambers.

10. The apparatus as claimed in claim 9, wherein the covering means includes at least one outer tube which surrounds the accumulator concentrically.

11. The apparatus as claimed in claim 10, wherein each outer tube has a circular cylindrical shape.

12. The apparatus as claimed in claim 11, wherein the outer tube extends substantially over an entire portion of the accumulator on which the strands are accumulated.

13. The apparatus as claimed in claim 11, wherein a plurality of outer tubes are provided which are arranged in a spaced longitudinal relationship to cover the accumulator in sections with gaps in between.

14. The apparatus as claimed in claim 10, wherein each outer tube is arranged in a stationary manner.

15. The apparatus as claimed in claim 9, wherein the covering means comprises a guide ring.

16. The apparatus as claimed in claim 9, wherein each covering means is rotatable.

17. The apparatus as claimed in claim 16, wherein each covering means is coupled to the rotating accumulator.

18. The apparatus as claimed in claim 16, further comprising:

a drive device operable to rotatably drive the respective covering means.

19. The apparatus as claimed in claim 1, further comprising:

a twisting device provided on the accumulator.

20. The apparatus as claimed in claim 19, wherein the twisting device has driver elements which engage in a positive manner in the chambers and drive the accumulator in a selected direction of rotation.

21. The apparatus as claimed in claim 1, wherein the accumulator has in an untwisted condition a total length between 5 and 10 m.

22. The apparatus as claimed in claim 1, wherein each chamber has a radial depth between 2 to 8 times larger than a maximum cross-sectional width of the stranding elements.

23. The apparatus as claimed in claim 1, wherein each chamber has an outer peripheral width at least 2 times larger than the maximum cross-sectional width of the stranding elements.

24. The apparatus as claimed in claim 1, wherein each stranding element is selected from a group consisting of electrical transmission elements and optical transmission elements.

25. The apparatus as claimed in claim 1, wherein the accumulator has, in an Untwisted condition, a total length between 6 m and 8 m.

26. The apparatus as claimed in claim 1, wherein each chamber has a radial depth between 2.5 to 4 times larger than a maximum cross-sectional width of the stranding elements.

27. The apparatus as claimed in claim 1, wherein each chamber has an outer peripheral width of 6 to 9 times larger than the maximum cross-sectional width of the stranding elements.

28. A method for stranding elongated stranding elements comprising the steps of:

providing a rotating accumulator which extends along a stranding axis in a longitudinal direction;

feeding stranding elements over the accumulator to a stranding disk;

stranding the stranding elements by the stranding disk; and guiding the stranding elements through open longitudinal chambers in the accumulator which extend in the longitudinal direction and which are radially inwardly open with respect to the stranding axis.

29. The method as claimed in claim 28, further comprising the steps of:

reversing rotation of the stranding disk; and accelerating the reversal rotation of the stranding disk by spring torsion of the accumulator.

30. The method as claimed in claim 28, further comprising:

rotating the accumulator in alternating rotational directions.

* * * * *